April 11, 1950     F. J. TRAINOR     2,503,854
SNAP ACTION CLAMPING DEVICE
Filed May 15, 1947
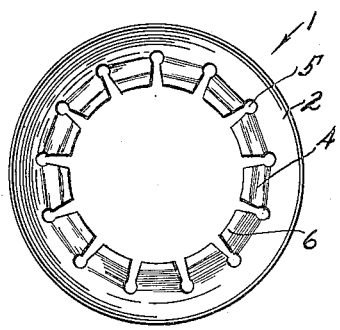
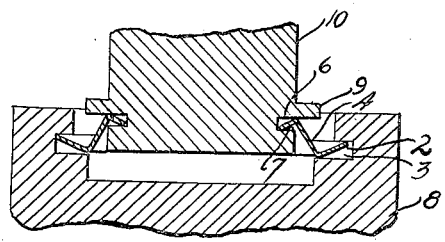
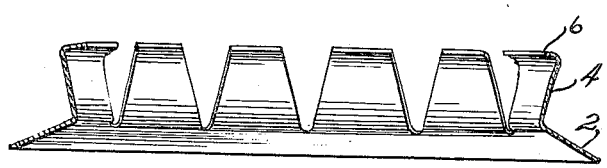
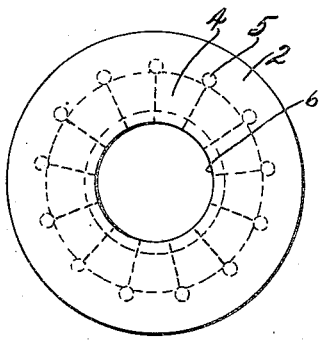
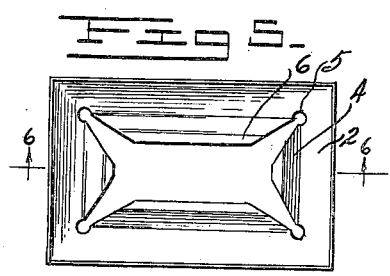
INVENTOR.
Foster J Trainor
BY
Henry Heyman
ATTORNEY Patented Apr. 11, 1950

2,503,854

UNITED STATES PATENT OFFICE 2,503,854

SNAP ACTION CLAMPING DEVICE

Foster J. Trainor, Holly Hill, Fla., assignor to Disto Corporation, Holly Hill, Fla.

Application May 15, 1947, Serial No. 748,291

8 Claims. (Cl. 287—119)

My invention relates to a clamping or latching element for use with a pair of members which are to be detachably coupled. More specifically it is a snap action element adapted to be associated with a pair of coupling members which are to be coupled together by pressure urging the members together, and which are to be detached by pressure urging the members apart.

I have devised a detachable clamping element in the form of an open geometric figure having a base and associated with the base, inwardly directed opposed prongs capable of motion toward and away from each other, and also in a direction normal to a plane passing through the outer perimeter of said base. This element is adapted to coact with a first of first and second coupling members having an elongated cylindrical or polygonal wall having at least one open end and having an internal groove in a plane normal to its longitudinal median line in which groove I loosely seat the outer peripheral portion of the clamping element. The second of said first and second coupling members has a shape similar to the shape of the first member, but reduced in size to loosely telescope into said first member and having a groove in its outer surface lying in a plane normal to its longitudinal axis to cooperate with the said prongs of the clamping element to thereby become detachably connected to the said first member through the medium of said clamping element.

An object of this invention is to provide a clamping element for use in coupling devices wherein it is desired to obtain a snap action engage and disengage characteristic.

Another object is to provide a coupling device which may be repeatedly engaged and disengaged simply and reliably.

Another object is to provide a snap action clamping element for use with coupling units having a snap action engage and release feature which is simple, rugged, and economical of manufacture.

Another object is to provide a coupling unit comprising two elements which snaps into engage condition when the elements are urged together, and which snaps to disengage when the elements are urged apart.

Still another object is to provide a coupling unit which provides a pressure engagement between members with which used.

Still another object is to provide a coupling device which is adaptable to couple together in snap engage and disengage relation, members of any geometric shape.

My invention further resides in the novel construction, and arrangement of parts of the coupling unit hereinafter described and specifically pointed out in the claims.

These and additional objects will become apparent from a consideration of the description and drawing.

Fig. 1 is a plan view of one form of clamping element;

Fig. 2 is a cross section of the clamping element applied to a pair of coupled members showing the relation of the parts in "engage" condition;

Fig. 3 is a cross sectional view showing the snap action clamping element in "disengage" condition;

Fig. 4 is a plan view of the metal blank from which one form of the clamping element is fabricated;

Fig. 5 shows a modified form of snap action clamping element;

Fig. 6 is a section through 6—6 of Fig. 5, showing the snap action clamping element in clamping condition; and Fig. 7 is a cross section through 6—6 of Fig. 5, showing the clamping element in open or released condition.

Referring to the drawing, I designate the snap action element generally with the numeral 1. As shown particularly in Figs. 1, 2 and 3, wherein I have shown the snap element 1 in circular form having a base 2, in the form of a dished annular ring of resilient material and having on the inner periphery thereof struck-up fingers 4, having a root portion integral with the portion of the ring from which struck, and extending in a direction approximately normal to a surface of the portion from which struck. Each of the fingers has a prong 6 struck thereon which extends inwardly, that is to say, toward the axis of the ring.

The base portion 2, which is the dished annular ring has two conditions of stability which are easiest explained as convex upward or convex downward if the plane of the outer periphery of the ring is horizontal. An equivalent statement is that if the ring is supported in the plane of its outer periphery, one condition of stability is that weherein the inner periphery has a position displaced axially in one direction from said plane; the second position of stability is that wherein the inner periphery has a position axially displaced on the opposite side of the said plane. One way in which I obtain this effect is by permanently stretching the resilient metal on or adjacent the inner periphery of the ring so that the ring takes on a dished shape. I can, however, make the base member from a continuous strip of metal, but so connecting the ends by any convenient manner, such as welding or brazing that the inner periphery is longer than it would be in a flat ring, but not as long as it would be in a cylinder. For instance, for a dished circular clamping ring having an outer peripheral radius $r'$ the inner peripheral radius $r''$ would be such as to make $$2\pi r'' > 2\pi(r'-w)$$

where $w$ is the width of a radial cross-section of the ring in its flat condition.

I find a simple and economical way to fabricate my clamping ring having a dished base is to punch out a flat blank of sheet metal in the form of an open-center flat disc having an outer radius substantially equal to the outer radius of the desired snap action clamping ring. The radius of the open center is obtained by subtracting from the outer radius, the width of the base, plus the desired length of the fingers and plus the desired length of the inturned prongs. I then radially slit the portion of the blank from the open center to the desired inner periphery of the snap ring base into any desired number of separate radial elements having root portions integral with the inner periphery of the base portion. I then strike-up the divided portions to a position normal to the base portion and at a desired distance from the base portion I inwardly strike prongs on the said fingers. I next stretch the inner periphery of the base at points between the upstruck prongs as by peening the metal thereof, so that the base assumes a dished shape.

While I have thus far described the clamping snap ring as generally circular, I wish to expressly state that it need not be circular, but can have any desired geometric shape, such as for instance, a triangle, rectangle, pentagon or any other polygon.

Regardless of the shape, the process of fabrication is essentially the same. However, in the case of any straight sided polygonal figure, such as I show in Figs. 5, 6 and 7, the number of fingers and prongs can be equal to the number of sides. For instance, the rectangular shaped clamping ring of Fig. 5 has four sides, four fingers and four inwardly directed prongs.

It will be noted that the extremity of the slits next to the inner periphery of the base portion 2, terminate in a circular aperture 5. This aperture is provided to disperse the stress in the resilient material to prevent the formation of fatigue cracks due to a large number of flexures.

It is now apparent from inspection of Figs. 3 and 7 in particular, that when the dished ring is upwardly convex, the root of the fingers is above the outer periphery of the ring, that the fingers now incline outwardly and that the space circumscribed by the inturned prongs is increased by the outward inclination of the fingers.

If pressure is exerted axially downward on the fingers, the dished ring will snap into its downwardly convex position, as shown in Figs. 2, and 6, and the fingers and therefore the prongs move axially downward a distance substantially equal to the axial motion of the inner periphery of the ring and the fingers and therefore the prongs circumscribe a decreased space by virtue of the inward inclination of the fingers. There is thus obtained two desirable simultaneous effects which are, axial motion toward the snap ring, and inward gripping of the prongs.

Fig. 2 shows one application of the device to a pair of members 8 and 10, which are to be detachably connected. In the member 8 which I term the receiving member, an internal groove 3 is provided to loosely receive the outer periphery of the snap ring. In the second, or insertion member 10, a groove 7 is provided having an outwardly extending upper shoulder 9. The outside dimension of the insertion member 10, below the groove is such as to freely pass into the space circumscribed by the prongs when the snap ring is in upwardly convex condition such as shown in Figs. 3 and 7. As the second or insertion member is urged toward the receiving member, the shoulder 9 on the insertion member presses against the prongs 6, until a position of dead center is reached. A slight further motion results in the ring snapping into the downward convex position, and thereby gripping the insertion member and at the same time drawing it axially toward the first member.

The axial motion obtained by the snap action clamping device thus far described is an important property, making the device applicable to coupling devices wherein either pressure or snap action is desired, such as for instance, electrical connectors which require pressure or rapid make and break connections, or both, or, for instance, containers such as humidors, wherein a continuous pressure between the side walls of a box and its top is desirable.

Having thus described my invention, what I claim is:

1. A snap action clamping device comprising, a strip of resilient material substantially circumscribing a closed geometric figure, and so disposed that the plane of the outer periphery of the said closed figure is laterally disposed to a plane passing through the inner periphery of the said closed figure, finger portions struck up on the inner periphery of portions of said geometric figure, each finger being normal to its respective portion of the geometric figure, and prongs struck on said fingers normal thereto and in a direction inwardly of said closed geometric figure.

2. A snap action clamping device having a base of resilient material, in the form of a strip so disposed as to at least partially enclose an area, said base being at all points inclined to a plane passing through the outer periphery of the said base, finger portions integral with the said base, each finger portion being normal to its contiguous base portion and prongs integral with said fingers and normal thereto and directed over the said partially enclosed area.

3. A snap action clamping device having a base portion, finger portions and prong portions, said base portion being a strip of resilient material enclosing a closed area, and being at all points equally inclined with respect to a plane passing through the longitudinal median line of said strip, said finger portions being portions struck-up normally to respective base portions, and being integral therewith, and prong portions being portions inwardly struck on said fingers.

4. A snap action clamping device having an open condition of stability and a closed condition of stability comprising a metal strip base portion, having integral therewith fingers normal thereto, and prongs normal to said fingers, said base portion having an open polygonal shape, the sides of which are so inclined as to present the surface of an upwardly converging frusto-section in the open condition and a downwardly converging frusto-section in the closed condition, said fingers being integral at one end with the inner peripheral portions of said sides, and normal respectively thereto, said prongs being integral at one end with the opposite end of said fingers and extending in a direction substantially parallel with and away from said respective inner peripheral portions of said sides.

5. A snap action clamping device, having a base, finger portions normal to said base, and prong members integral with said finger portions, said base being a dished continuous strip of resilient material, said finger portions being each integral with a respective portion of the inner periphery of said strip and extending normal thereto, and said prong portions being portions of the finger portions struck in a direction substantially normal thereto and away from the base portion.

6. In combination, a pair of coupling members, and a snap action clamping device, a first of said coupling members being hollow and having a groove in the inner surface thereof lying in a plane normal to the longitudinal axis thereof, said snap action clamping device having a continuous open base portion conforming in external shape to the shape of said hollow body, and for partially seating in said groove, struck-up fingers on the inner periphery of said base, having inwardly directed prongs on the free ends thereof, and a second of said coupling members adapted to telescope within said first coupling member, having a peripheral groove therein, and an overlying shoulder forming the upper boundary of said groove, said base portion having a dished shape whereby a condition of stability is obtained when convex upward and a second condition of stability is obtained when convex downward, whereby said second coupling member can pass into the snap ring up to the shoulder and into the first coupling member, and under the influence of pressure exerted by the aforesaid shoulder against the inwardly directed prongs said snap ring is caused to snap from upward convex condition to its downward convex condition, whereby said inwardly directed prongs are caused to spring radially inward into the groove of said second coupling member; and axially toward the first coupling member.

7. In a snap action clamping device, a base having straight sides, said sides being connected at the ends thereof whereby a frusto-shape is obtained, said base being a strip of resilient metal whereby the frusto-shape can be inverted by springing the metal strip, at least one upstruck portion on each straight side and at least one instruck portion on the upper end of said upstruck portions, whereby said upstruck portions incline outwardly when said frusto-shape is convex upward, and said upstruck portions incline inwardly when said frusto-shape is convex downward, and whereby the instruck portions move inwardly and downwardly when said base moves from one convex condition to the second convex condition.

8. In combination in a coupling device, a first coupling member having flat walls enclosing a space, a second coupling member having a shape similar to that of the first member but reduced in size whereby it is capable of telescoping into said first member, a groove in the interior of said first member lying in a plane normal to the longitudinal median line therethrough, a snap action clamping device having a base comprising a continuous strip of resilient material, and having the outer periphery of said base loosely seated in said groove, finger members affixed to the inner periphery of said base and extending normal thereto, and prong members affixed to the free end of said finger members and extending normal thereto, and inwardly with respect to said space, said base having two conditions of stability which are convex upwardly and convex downwardly, said second coupling member having a groove in the outer surface thereof and a shoulder forming the upper wall of said groove, said second coupling member being adapted to telescope within said prong members when said base is convex upward, and to be gripped by said prong members when said base is caused to move to the convex downward condition under the influence of pressure exerted by said shoulder against said prongs.

FOSTER J. TRAINOR.

REFERENCES CITED

The following references are of record in the file of this patent:

UNITED STATES PATENTS

| Number | Name | Date |
| --- | --- | --- |
| 766,261 | Jebsen | Aug. 2, 1904 |
| 1,192,404 | Ewart | July 25, 1916 |
| 1,390,266 | Armstrong | Sept. 13, 1921 |
| 1,844,463 | Dodd | Feb. 9, 1932 |
| 2,064,091 | Tinnerman | Dec. 15, 1936 |
| 2,374,309 | Roys | Apr. 24, 1945 |